(12) United States Patent
Marks et al.

(10) Patent No.: US 7,427,094 B2
(45) Date of Patent: Sep. 23, 2008

(54) VEHICLE IMMOBILISATION DEVICE

(75) Inventors: Russell Lee Marks, Surrey (GB); Colin James Heffron, Upper Brookville, NJ (US)

(73) Assignee: Actionmirror Limited (GB)

( * ) Notice: Subject to any disclaimer, the term of this patent is extended or adjusted under 35 U.S.C. 154(b) by 282 days.

(21) Appl. No.: 10/535,014

(22) PCT Filed: Nov. 14, 2003

(86) PCT No.: PCT/GB03/04952

§ 371 (c)(1),
(2), (4) Date: Dec. 27, 2005

(87) PCT Pub. No.: WO2004/045925

PCT Pub. Date: Jun. 3, 2004

(65) Prior Publication Data

US 2006/0151987 A1    Jul. 13, 2006

(30) Foreign Application Priority Data

Nov. 15, 2002 (GB) ............................ 0226747.4
May 16, 2003 (GB) ............................ 0311334.7

(51) Int. Cl.
  *B60J 1/20* (2006.01)
(52) U.S. Cl. .................... 296/95.1; 296/96.11
(58) Field of Classification Search .............. 296/95.1, 296/96.7, 97.11, 96.11, 97.6
See application file for complete search history.

(56) References Cited

U.S. PATENT DOCUMENTS

| | | | |
|---|---|---|---|
| 1,464,186 A | 8/1923 | Oberreich | |
| 1,663,044 A | 3/1928 | Furlong | |
| 5,564,770 A | * 10/1996 | Smith et al. | ................ 296/95.1 |

FOREIGN PATENT DOCUMENTS

| | | |
|---|---|---|
| GB | 375801 | 6/1932 |
| GB | 384578 | 12/1932 |
| GB | A-2091658 | 8/1982 |
| GB | A-2115751 | 9/1983 |
| GB | A-2255756 | 11/1992 |
| GB | A-2285420 | 7/1995 |
| WO | WO-A-90/01999 | 3/1990 |

OTHER PUBLICATIONS

Examination Report from U.K. Patent Office in corresponding application No. GB 0326616.0.
Combined Search and Examination Report for priority application GB0226747.4.
Search Report for priority application GB03266160.
International Preliminary Examination Report for corresponding international application PCT/GB03/04952.

* cited by examiner

*Primary Examiner*—Lori L Lyjak
(74) *Attorney, Agent, or Firm*—Intellectual Property Law Office of Joel D. Voelzke

(57) ABSTRACT

A vehicle immobilisation device (60) is provided for securing to a vehicle windscreen, comprising screening means (46a; 46b) which is changeable from a first, more compact configuration to a second configuration and which, when the device is in an in-use disposition on the vehicle windscreen, serves to impair a driver's view through the windscreen. Suction grip means (40a; 40b) are provided for holding said screening means in the in-use disposition on the windscreen by suction. Release means (51) are also provided to enable release of the suction of said suction grip means so as to allow removal of the device from the windscreen.

31 Claims, 11 Drawing Sheets

VEHICLE IMMOBILISATION DEVICE

The present invention relates to a vehicle immobilisation device.

Wheel clamp devices are in common use today for dealing with illegally parked vehicles. Such a wheel clamp device is attached to the wheel of an illegally parked vehicle by a wheel clamp operative so as to prevent the owner of the vehicle from driving the vehicle away. At the same time as deploying the wheel clamp device on the illegally parked vehicle, the wheel clamp operative will usually display a notice in the window of the vehicle informing the owner that the vehicle is illegally parked and that the wheel clamp device will remain on the vehicle until such a time as a penalty fee is paid. When the owner of the vehicle has contacted the authorities and paid the penalty fee, the wheel clamp operative is instructed to return to the vehicle to remove the wheel clamp device, after which the owner of the vehicle is free to remove the vehicle.

One problem with such existing wheel clamp devices is that, in order to be effective in immobilising the vehicle as well as strong and secure enough to prevent unauthorised removal of the device (by means of force or otherwise), they tend to be very bulky and heavy. Furthermore, the complexity of many such wheel clamp devices makes the successful and secure deployment very difficult to achieve for an inexperienced wheel clamp operative. The wheel clamp operative can also be put at a great risk when deploying a wheel clamp device on a vehicle that is parked flush to an obstacle on one side (for example a kerb), forcing the operative to work in the flow of oncoming traffic on the exposed side of the vehicle. Wheel clamp devices are also often ineffective against large-wheeled vehicles such as trucks and buses.

It is therefore desirable to provide a vehicle immobilisation device which is free from the above-mentioned problems associated with the use of traditional wheel clamp devices.

According to a first aspect of the present invention there is provided a vehicle immobilisation device for securing to a vehicle windscreen, comprising: screening means which, when the device is in an in-use disposition on the vehicle windscreen, serves to impair a driver's view through the windscreen, wherein the screening means is changeable from a first configuration to a second configuration, the first configuration being more compact than the second configuration; suction grip means for holding said screening means in said in-use disposition on said windscreen by suction; releasing means for enabling release of the suction of said suction grip means so as to allow removal of the device from the windscreen; and security means for preventing unauthorised operation of said releasing means.

According to a second aspect of the present invention there is provided a method for securing a vehicle immobilisation device according to the first aspect to a vehicle windscreen, comprising the steps of: arranging said screening means on the vehicle windscreen in said in-use disposition so as to impair a driver's view through the windscreen; activating said suction grip means so as to hold said screening means in said in-use disposition on said windscreen; and activating said security means so as to prevent unauthorised operation of said releasing means.

According to a third aspect of the present invention there is provided a method for removing a vehicle immobilisation device secured to a vehicle windscreen by a method as claimed in any one of claims 29 to 32, comprising the steps of: de-activating said security means so as to enable operation of said releasing means; operating said releasing means to deactivate said suction grip means; removing the vehicle immobilisation device from the vehicle windscreen.

Preferably, the screening means is changeable from a first configuration to a second configuration, the first configuration being more compact than the second configuration. One advantage of this feature is that the device may be more easily transported and/or stored when not in use, and yet may still serve to impair the forward visibility of the driver of the vehicle to which the device is secured. Furthermore, it is envisaged that the size of the screening means may be adapted by the operator so that the device may better fit a different sized windscreen.

According to a fourth aspect of the present invention, there is provided a screening means of a vehicle immobilisation device, the screening means being changeable from a first configuration to a second configuration, the first configuration being more compact than the second configuration and having means for allowing engagement with a suction grip means of the device.

Numerous means by which the screening means may be changed from the first, more compact, configuration to the second configuration, will be readily apparent to the person skilled in the art. For example, the screening means may comprise a plurality of separate screen portions arranged and connected, for example by means of hinges, so as to be foldable. Alternatively, the screening means may comprise a plurality of screen portions, at least two of which are operable to slide relative to one another in a telescopic fashion. As a further alternative, the screening means may be rolled up from the second configuration to the first configuration and unrolled from the first configuration to the second configuration. The screening means may also comprise a combination of a flexible material, such as rubber, which is provided with a plurality of formings which define one or more axes along which the screening means may be conveniently folded.

It will be appreciated that the number and location of the suction grip means will preferably, but not essentially, be chosen so as to enable the screening means to be held in the second configuration when disposed on the vehicle windscreen. For example, a suction grip means may be provided at or near each of the four corners of the screening means.

Alternatively, it may be advantageous or necessary to provide a means by which the screening means can be securely held in the second configuration. Appropriate ways of achieving this will be readily apparent to the person skilled in the art and include, for example, the use of bolts, lockable hinges or other latching mechanisms to secure a plurality of hingeably connected screen portions in the second configuration. Alternatively, one or more rigid members may be provided which at least partially span across two or more separate screen portions so as to secure the screening means in the second configuration. Similarly, in the case where the screening means may be operable to be rolled up, one or more rigid members may be usefully employed in order to help hold the screening means in the second configuration.

The screening means may be adapted to be secured to the windscreen whilst still in said first configuration or may be adapted to be secured to the windscreen after being changed to the second configuration.

Reference will now be made, by way of example, to the accompanying drawings, in which.

Figure 1:
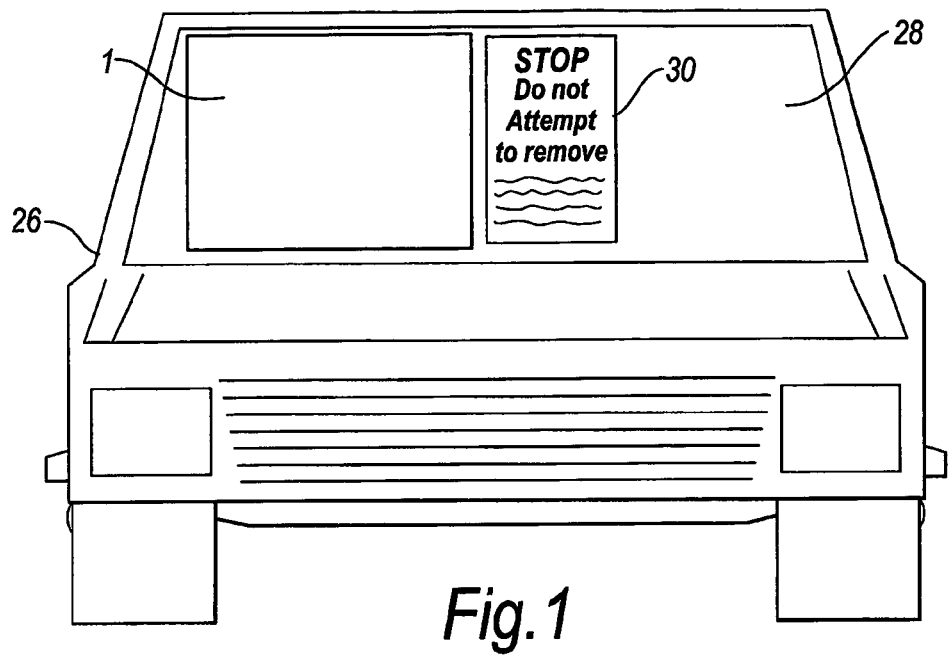
FIG. 1 is a front view of a vehicle to which a vehicle immobilisation device according to a first embodiment of the present invention has been secured.
Figure 2:
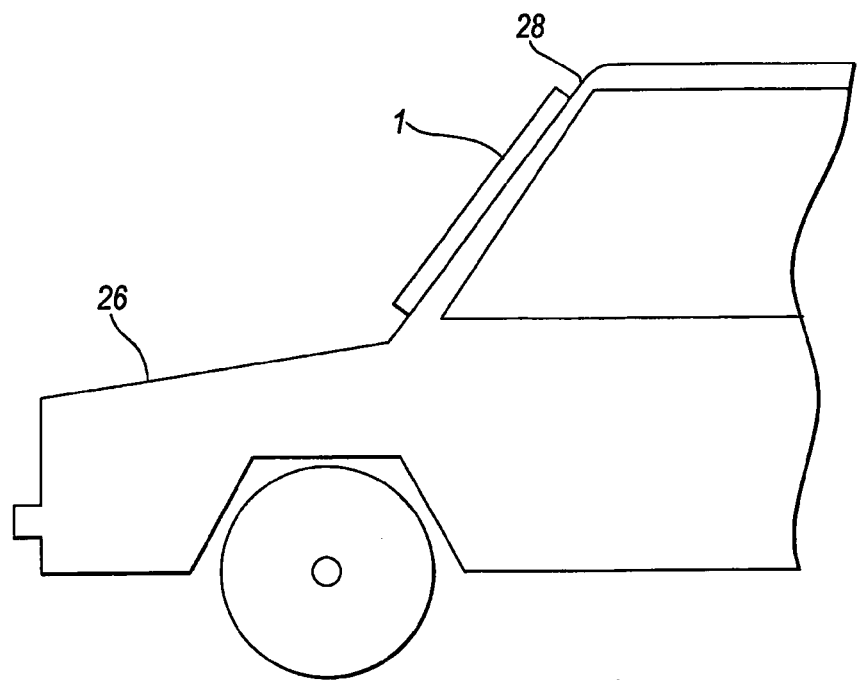
FIG. 2 is a side view of the vehicle of FIG. 1.

FIG. 1 shows a vehicle immobilisation device 1 according to a first embodiment of the present invention secured to the exterior of the windscreen 28 of a vehicle 26, and FIG. 2 is a side view of the same vehicle 26 showing the vehicle immobilisation device 1 secured to the vehicle windscreen 28. The vehicle immobilisation device 1 of the first embodiment is accompanied by an adhesive sticker 30 fixed onto the front windscreen 28 warning the driver of the vehicle that no attempt should be made to move the vehicle 26 or remove the vehicle immobilisation device 1.

Figure 3:
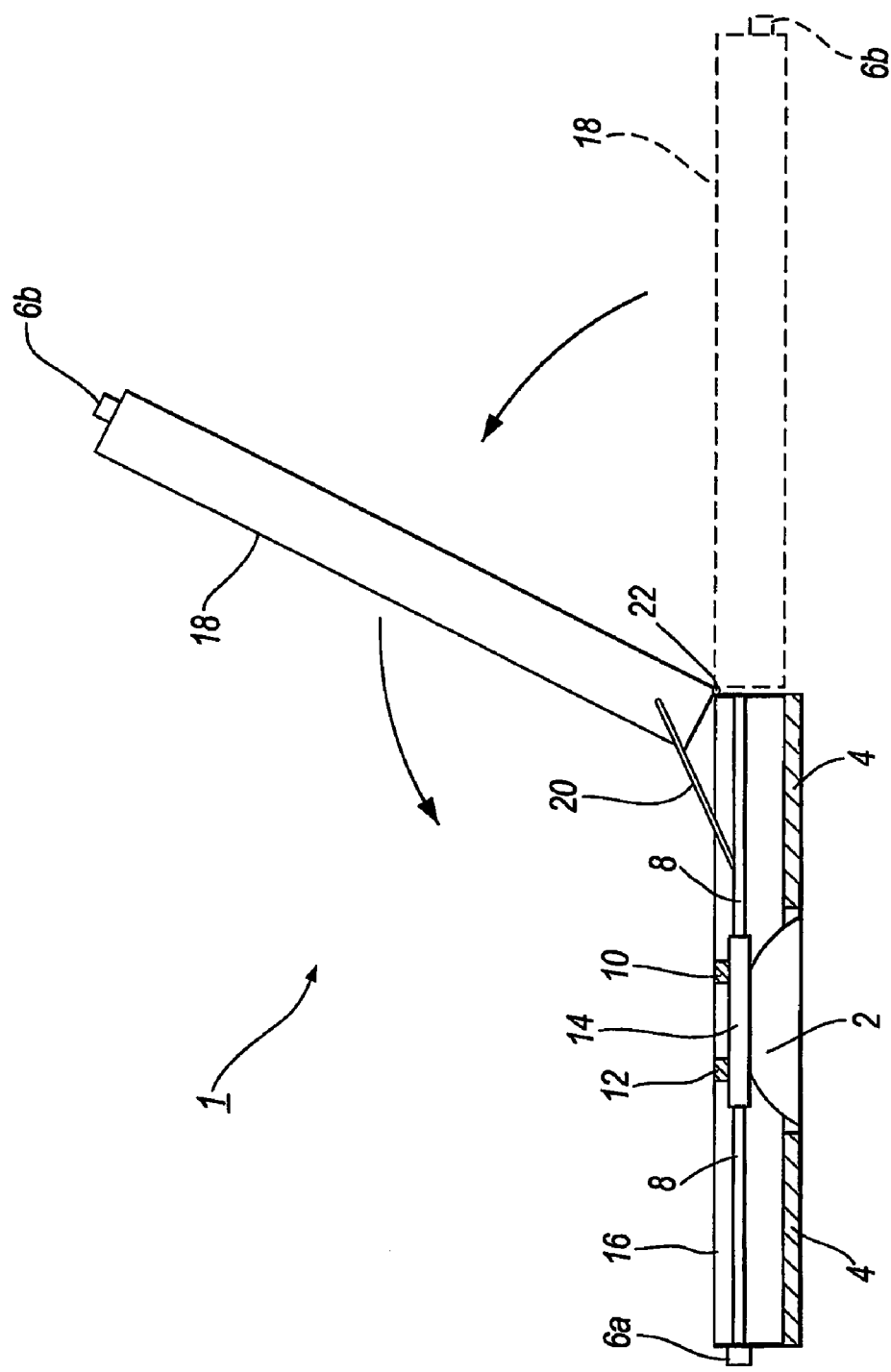
FIG. 3 is a side view of the first embodiment of the present invention shown in an open state.
Figure 4:
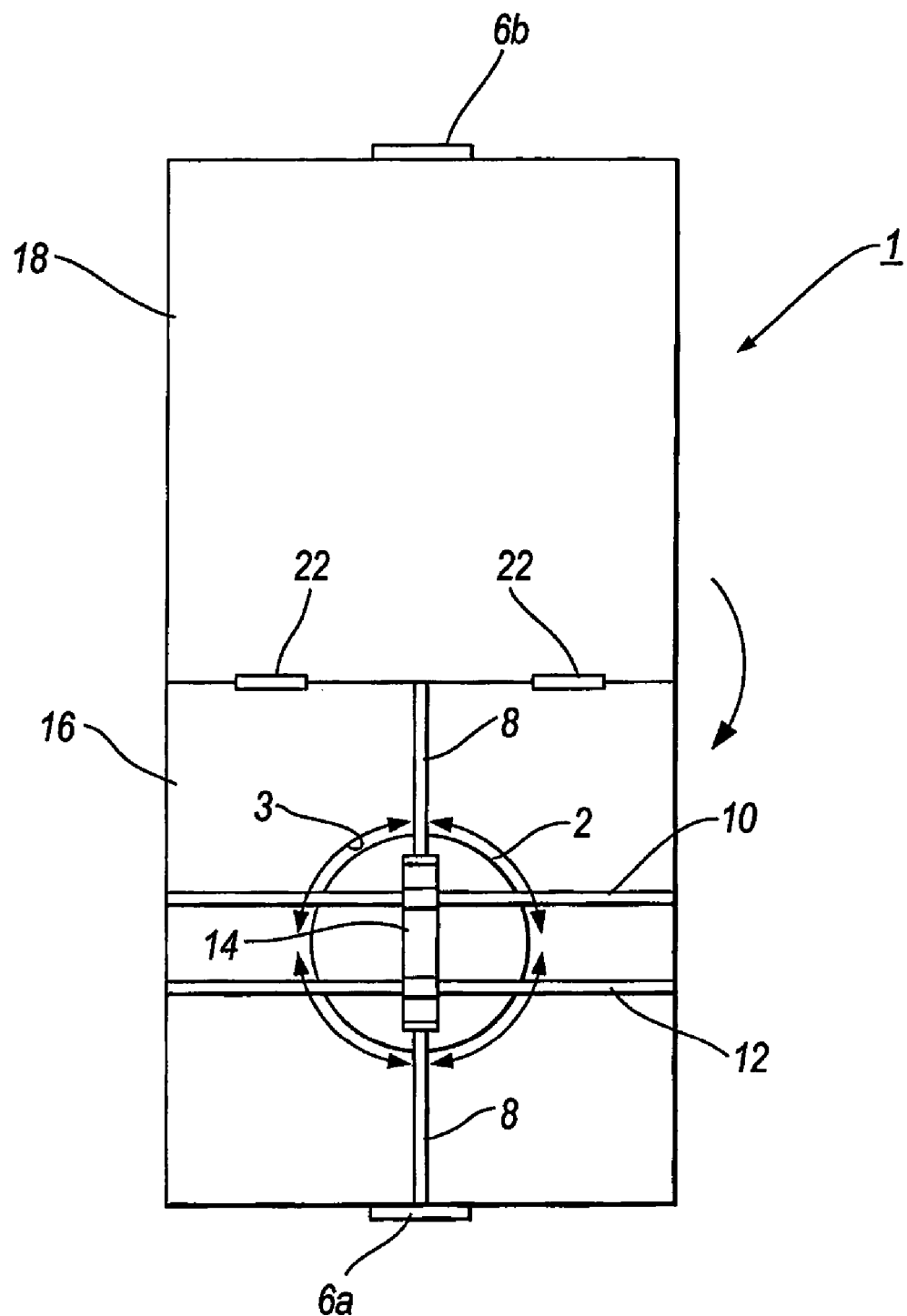
FIG. 4 is a plan view showing the first embodiment of the present invention in an open state.
Figure 5:
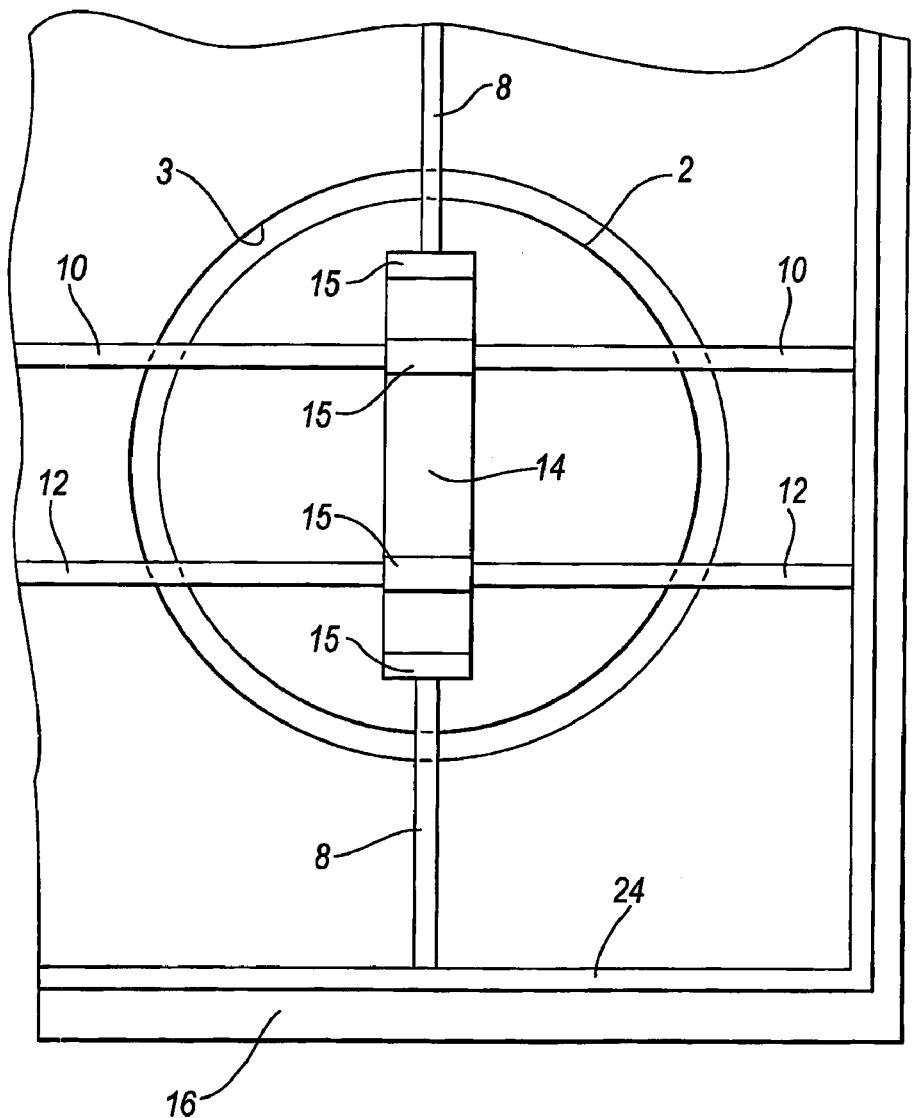
FIG. 5 is a plan view showing parts of FIG. 4 in more detail.

The vehicle immobilisation device 1 of the first embodiment of the present invention will now be described in more detail with reference to FIGS. 3 to 5. The vehicle immobilisation device 1 comprises a housing member 16 incorporating a suction grip 2, as well as first, second and third strut members 8, 10 and 12 respectively serving to secure said suction grip within the housing member 16. The suction grip 2 can be secured in a pivotal manner within the housing member 16, e.g. by use of a ball and socket arrangement, so as to provide the device with extra flexibility to cope with windscreen curvature.

The suction grip 2 is formed in this embodiment as a flexible rubber suction cup (such suction grips are commonly used in the glazing industry for the moving of panes of glass), the open end of which projects a small distance through a cut-out 3 in the lower face of the housing member 16. An annular protective layer 4 of high density foam is formed on the lower face of the housing member 16 around the protruding suction grip 2, the thickness of the protective layer 4 being substantially the same as the protrusion distance of the suction grip 2. It should be appreciated that, as an alternative to high density foam, rubber may be used.

Further incorporated within the housing member 16 is a pump handle 14 which is connected operatively to a suction device (not shown) which is operated in use to suck air from within the suction grip 2. As shown in FIG. 5, the pump handle 14 is fixed to the strut members 8, 10 and 12 by fixing members 15. The strut members 8, 10 and 12 are fixed to the housing member 16 by a fixing member 24 secured to the inside of the housing member 16. A releasing mechanism (not shown) is further provided within the housing member 16 which when operated allows air to be re-introduced into the suction grip 2, thereby releasing the suction.

A covering member 18 of the vehicle immobilisation device 1 is hinged to the housing member 16 by a hinge 22. The dotted outline of the covering member 18 in FIG. 3 shows the vehicle immobilisation device 1 of the present embodiment in a fully open state, while the solid-line outline of the covering member 18 shows the vehicle immobilisation device 1 in a partially open state. A retaining strut 20 is provided to retain the covering member 18 in the partially open state. A security (or locking) mechanism 6b is provided on the covering member 18 which engages with a corresponding security mechanism 6a provided on the housing member 16 when the covering member 18 is rotated to a fully closed position. When the covering member is in the closed position, the security mechanism 6a, 6b prevents unauthorised access to and operation of the components held within the housing member 16.

The operation and deployment of the vehicle immobilisation device 1 will now be described. The vehicle immobilisation device 1 is firstly positioned on the exterior of the windscreen 28 as shown in FIG. 1 with the suction grip 2 and protective layer 4 making contact with the windscreen 28. The vehicle immobilisation device 1 of the first embodiment forms a continuous opaque screen member which, when in an in-use disposition on the windscreen 28 of the vehicle 26, serves to impair the view through the windscreen of a driver of the vehicle, so as to make it impossible to drive the vehicle away in a safe and legal manner. The ideal positioning and size of the screen member will be described below with reference to FIG. 6.

Once in position on the windscreen 28, the covering member 18 is swung open and retained in a partially open position by use of the retaining strut 20. Use of such a retaining strut 20 is beneficial since it prevents the covering member 18 moving to a fully open position where it might make contact with and potentially damage the surface of the vehicle 26 on which the vehicle immobilisation device 1 is being secured. Likewise, the high density foam layer 4 protects the vehicle 26 and the windscreen 28 from being scratched as the vehicle immobilisation device 1 is being fitted.

When the vehicle immobilisation device 1 is in a suitable position on the vehicle windscreen 28, the pump handle 14 is operated by the operative to pump air out of the suction grip 2 thereby to create a partial vacuum within the interior of the suction grip 2. The retaining strut 20 is then released and the covering member 18 is swung down to the fully closed position. The security mechanism 6a, 6b is activated to lock the vehicle immobilisation device 1 closed so that unauthorised access and operation of the components within the housing member, in particular the releasing mechanism, is prevented. A warning sticker 30 (or alternatively an LED message display sticker) is then adhered to the vehicle windscreen 28 informing the driver of the action he should take to have the device removed and warning him that attempting to drive the vehicle with the device in place would be an offence, as would an unauthorised attempt to remove the device in any way. The vehicle 26 is thus rendered substantially immobile. The adhesion created by the suction grip 2 is of such a strength as to make the forceful removal of the vehicle immobilisation device from the vehicle windscreen almost impossible; such an attempt to remove the device would anyway be illegal.

The vehicle immobilisation device 1 is removed from the vehicle windscreen 28 by first deactivating the security mechanism 6a, 6b, opening the covering member 18 to the partially opened state by use of the retaining strut 20, and then operating the releasing mechanism (not shown) to release the partial vacuum from the suction grip 2. The vehicle immobilisation device 1 can then be removed from the vehicle windscreen 28 and stowed away for subsequent re-application.

When the vehicle immobilisation device 1 is in an armed state and secured to the vehicle windscreen 28, it sits flush to the windscreen 28 with the high-density foam protective layer 4 in contact with the windscreen 28 and the suction grip 2 holding the device 1 in tight contact with the windscreen 28. The size of the gap between the housing member 16 and the windscreen 28 is preferably of the order of millimetres, with the gap being filled by the high density foam protective layer 4. The small size of the gap makes the prising-off of the vehicle immobilisation device 1 or the use of other invasive methods of removal more difficult. In the present embodiment the high density foam protective layer 4 not only serves to prevent scratches and the like to the vehicle windscreen 28 but it also serves as a suction grip protection mechanism to prevent insertion of a piercing instrument or the like which may be used in an attempt to pierce the suction grip 2. Use of a toughened rubber compound for the suction grip is also beneficial to make piercing more difficult should this be attempted.

As shown in FIG. 2, the vehicle immobilisation device 1 assumes a substantially flat profile on the vehicle windscreen 28. The lateral dimensions of the vehicle immobilisation device 1 are determined by the basic requirement that the vehicle immobilisation device must serve its purpose of impairing the forward visibility of a driver of the vehicle to which the device is secured to such an extent as to render the vehicle dangerous and illegal to drive. A very wide screening member will provide good vision impairment but may result in a vehicle immobilisation device which is too large or bulky for ease of use, while a narrower screening member will result in a more lightweight device but will provide less vision impairment.

Figure 6:
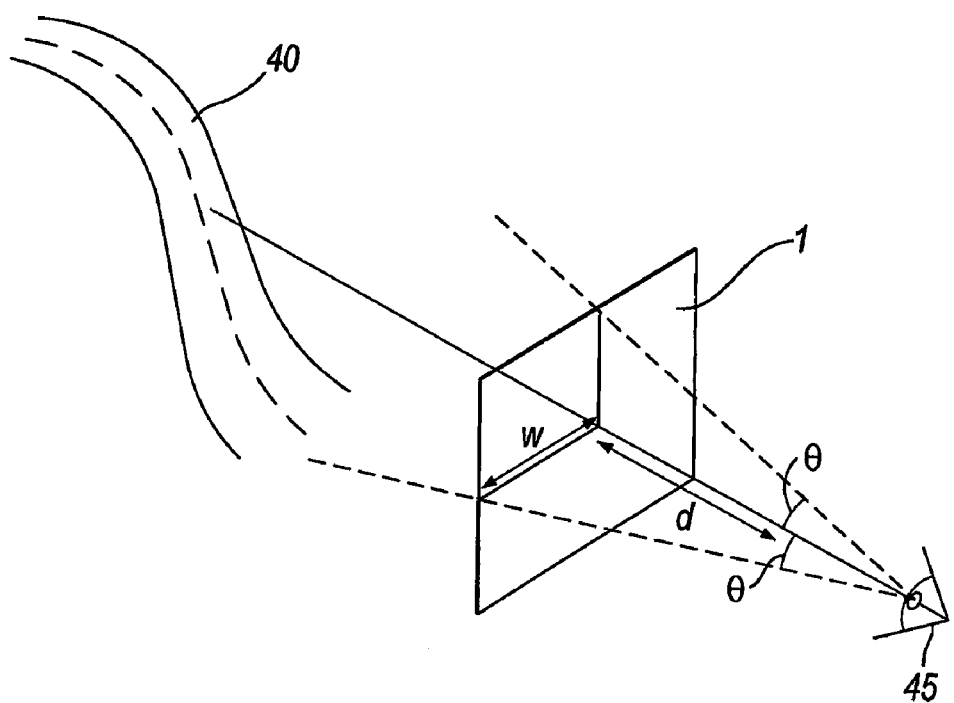
FIG. 6 is a schematic diagram for use in explaining the size and positioning of an embodiment of the present invention.

FIG. 6 is a schematic diagram showing the relative positions of the vehicle immobilisation device 1, the driver's eye 45 and the driver's view of the road 40 ahead. For the purpose of this illustration, it is assumed that the vehicle immobilisation device 1 is square-shaped. The vehicle immobilisation device 1 is preferably positioned on the vehicle windscreen 28 such that the centre of the vehicle immobilisation device 1 is directly in the usual line of sight from the driver's eye 45 to the road 40 lying ahead of the driver.

The distance d between the driver 45 and the windscreen 28 on which the vehicle immobilisation device 1 is secured will vary from vehicle to vehicle and from driver to driver, but an estimate of the maximum distance d will serve as a useful guide for the selection of appropriate width 2w for the vehicle immobilisation device 1 (the distance is limited by the reach of the driver to the steering wheel). One parameter by which to measure the degree of vision impairment provided by the vehicle immobilisation device 1 is the angle θ shown in FIG. 6. The greater the value of θ, the more impairment of the driver's view through the windscreen is provided. For effective impairment, the value of θ is preferably more than 5°, and more preferably greater than 10°, and more preferably greater than 15°. The width 2w of the vehicle immobilisation device 1 is then calculated from the chosen value of θ according to the following formula: $w = d \tan \theta$.

Figure 7:
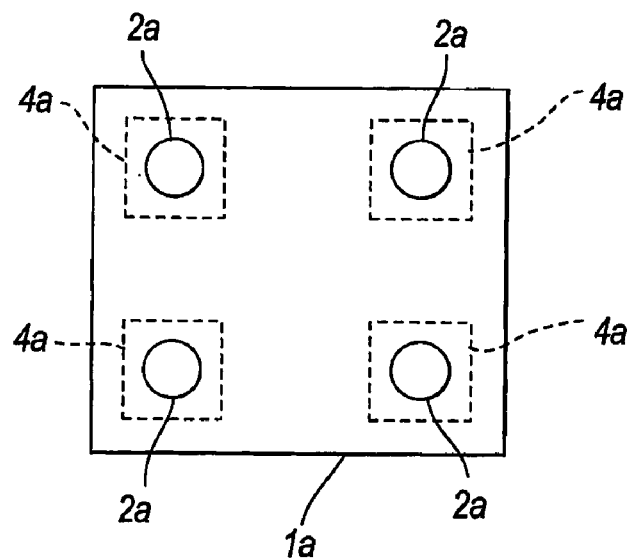
FIG. 7 shows a variation of the first embodiment of the present invention having more than one suction grip.

Although the first embodiment has been described as having a single suction grip 2 located substantially in the centre of the vehicle immobilisation device 1, it will be appreciated that a greater number of suction grips can be provided and placed at various positions on the vehicle immobilisation device. For example, FIG. 7 shows a vehicle immobilisation device 1a that comprises four separate suction grips 2a located towards the four corners of the vehicle immobilisation device 1a. Although it is preferable for the high density foam protective layer to cover substantially the entire lower surface of the housing member 16, this is by no means essential. For example, in the vehicle immobilisation device 1a of FIG. 7 the foam protective layer 4 is confined to the vicinity around the suction grips 2a as shown by the dotted lines in FIG. 7. Such a foam layer 4a is still able to provide protection against scratches and the like, and it still serves the purpose of hindering access of an invasive device to the suction grips 2a.

The first embodiment is described above as being provided with its own means for producing the required partial vacuum in the suction grip 2 by way of a pump handle 14 operating a suction device (not shown). It will be appreciated that it is not necessary to provide a vehicle immobilisation device embodying the invention with its own means for producing a partial vacuum, but instead it would be possible to provide suitable means for connecting the suction grip to an external suction device. The operative would simply attach the external suction device to the vehicle immobilisation device when required in order to create the partial vacuum in the suction grip.

In the above first embodiment, the covering member 18 serves as the primary screening member that serves to impair the driver's forward visibility, although clearly other parts of the vehicle immobilisation device also serve the function of screening, in some degree or another, the view of the road ahead from the driver. For example, the housing member 16 and the suction grip 2 are both opaque in this embodiment and therefore act to impair the driver's vision. However, it is the covering member 18 in the first embodiment that is principally intended to function as the screening member.

In contrast to the first embodiment in which the principal screening member is constructed as a single entity, a second embodiment will now be described with reference to FIGS. 8A and 8B, in which the screening member comprises a plurality of separate sections.

Figure 8A:
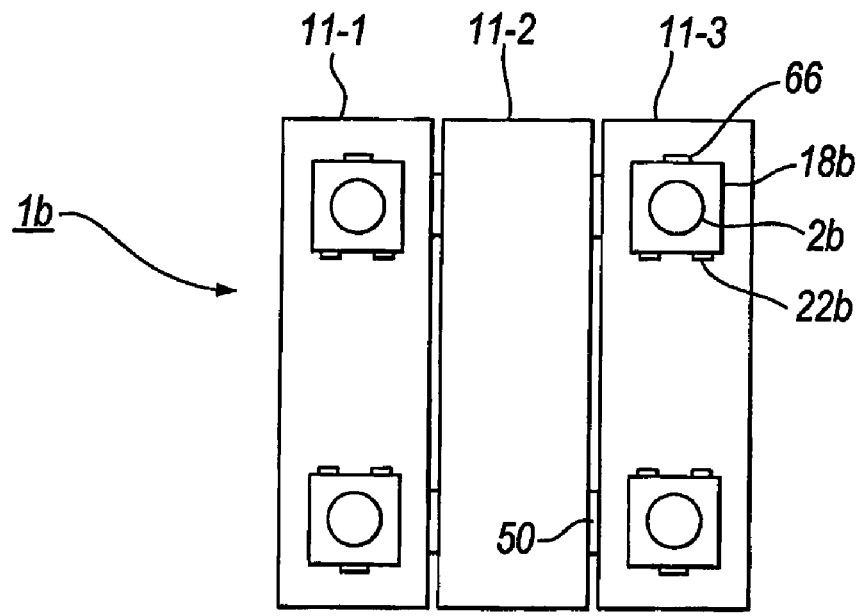
FIG. 8A is a plan view of a vehicle immobilisation device according to a second embodiment of the present invention.

FIG. 8A is a plan view showing a vehicle immobilisation device 1b according to a second embodiment of the present invention. The vehicle immobilisation device 1b comprises three separate screen portions 11-1, 11-2 and 11-3. The vehicle immobilisation device 1b of the second embodiment comprises four suction grips 2b, two of which are located on the first screen portion 11-1 and the other two of which are located on the third screen portion 11-3. A security device is provided for each of the suction grips 2b, comprising a security lid 18b connected by a hinge 22b to the appropriate screen portion 11-1 or 11-3, the lid 18b being secured by means of a locking mechanism 66. The first screen portion 11-1 is hinged to the second screen portion 11-2 which itself is hinged to the third screen portion 11-3 by use of hinges 50.

Figure 8B:
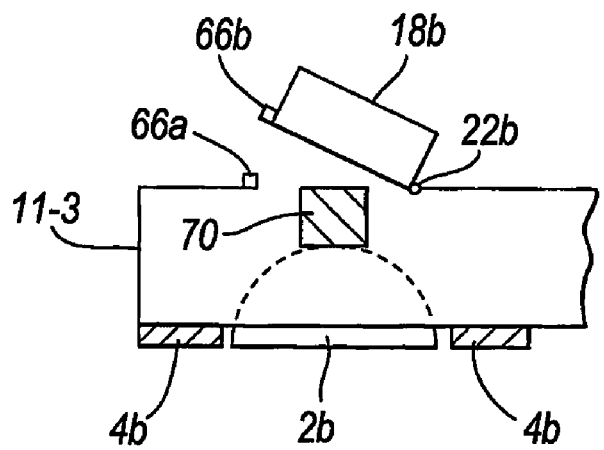
FIG. 8B is a side view of part of the second embodiment of the present invention.

FIG. 8B is a side view showing in more detail the construction of one of the suction elements of the vehicle immobilisation device 1B. As in the first embodiment, a protective layer 4b is arranged around each suction grip 2b. It will be appreciated that the provision of such a protection layer is preferable but not essential. The locking mechanism 66 shown in FIG. 8A is shown in FIG. 8B to comprise a first locking element 66b provided on the security lid which engages with a second locking element 66a provided on the screen member concerned (11-3 in FIG. 8B).

In order to save space, in the second embodiment, each suction grip 2b is not provided with its own suction device and pump handle as in the first embodiment. Instead, a pump connection mechanism 70 is provided which enables the suction grip 2b to be connected to an external pump device at the time of securing the device 1b to the vehicle windscreen. After the suction grip 2b has been activated so as to provide a grip on the windscreen, the external pump device is removed from the connection mechanism, the securing lid 18b is closed, and the locking mechanism 66 is activated to prevent unauthorised removal of the device 1b.

Removal of the vehicle immobilisation device 1b of the second embodiment is achieved by deactivating the locking mechanisms 66 in turn, opening each of the security lids 18b, and operating the releasing means so as to deactivate the suction grips. Once removed, the vehicle immobilisation device 1b can be folded or rolled up for compact storage.

It will be appreciated that the security lids 18b of the second embodiment need not be hinged to one of the screen portions 11-1 to 11-3. Instead a security lid may be in the form of a removable cap, preferably secured to the vehicle immobilisation device by a securing wire or the like so as to prevent the loss thereof.

Other arrangements of screen portions and associated folding mechanisms will be readily apparent to the person skilled in the art. For example, FIG. 9 shows a vehicle immobilisation device 1c comprising two screen portions 33-1 and 33-2, a suction grip 2c provided on the first screen portion 33-1 and a security lid 18c connected by a hinge 22c to the screen portion 33-1. A locking mechanism 66c is also provided.

The screen portion 33-2 is provided, at opposing edges 34 and 35, with a receiving section. The screen portion 33-1 is arranged so as to be slideably received within the receiving section in a telescopic fashion, thereby allowing the device to be moveable from a first, more compact configuration, to a second configuration large enough to impair a driver's view when disposed on the vehicle windscreen. A pair of rigid members 37a and 37b are provided on the screen portion 33-2, each rigid member comprising a foldable strut which may be extended to span across both screen portions and secured in an extended configuration by a latch, a locking means or any other suitable means.

Figure 9A:
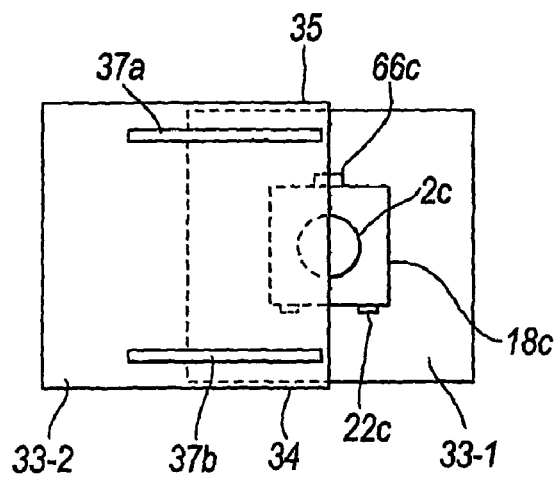
FIG. 9 shows a third embodiment of the present invention.
Figure 9B:
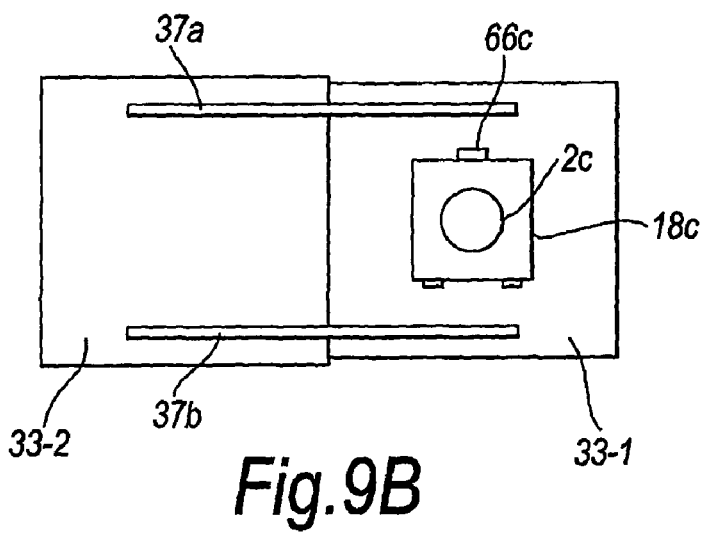
Figure 9C:
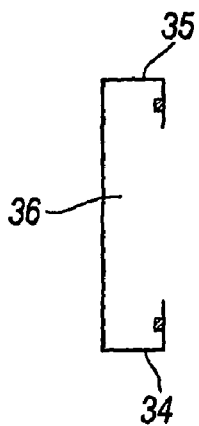

FIG. 9A illustrates the device when between the first configuration and the second configuration, the screen portion 33-1 being partially received within the receiving section 33-2. The rigid members 37a and 37b are shown in a folded configuration. FIG. 9B shows the device in the second configuration, the rigid members shown in an extended configuration. FIG. 9C shows a sectional view through the line A-A.

A further embodiment of the present invention will now be described with reference to FIG. 10.

Figure 10A:
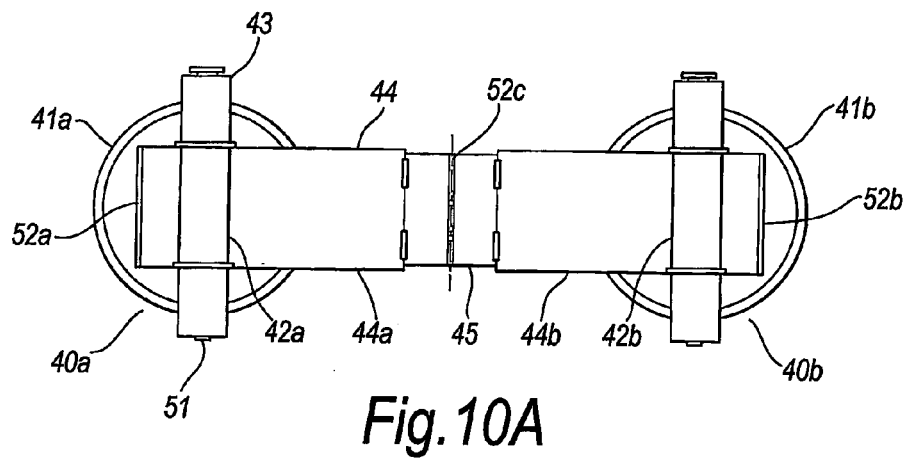
FIG. 10 shows a fourth embodiment of the present invention.

FIG. 10A shows a plan view of a pair of suction grip means 40a and 40b. Each suction grip means comprises a flexible rubber suction cup 41 and a pump handle 42a and 42b operatively connected to the respective suction cup. The pump handle comprises a plunger 43 and a release mechanism 51. The suction grip means 40a and 40b are connected together by means of a strut 44, which is formed in two halves 44a and 44b joined together by means of a double hinge joint 45. Protrusions 52a, 52b and 52c are provided on each of the suction cups and the hinge joint 45 (shown more clearly in FIG. 10D).

Figure 10B:
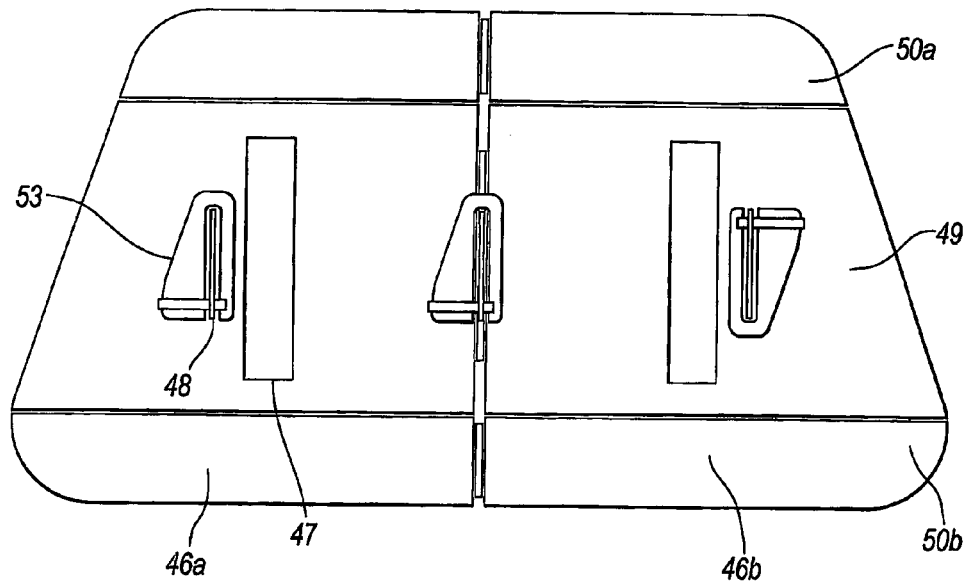

FIG. 10B shows a pair of rigid screening portions 46a and 46b which are joined together by means of a hinge to form a screening means which is changeable from a first configuration to a second configuration, the first configuration being more compact than the second configuration. When in the second configuration, the screening means exhibits a shape that substantially conforms to that of a vehicle windscreen. Each screening portion is provided with a first covered aperture 47 and a second aperture 48 and has a strip of rubber around its circumference. In order to accommodate different sized windscreens, the screening portions of this embodiment each comprise a central section 49 and two side sections 50a and 50b. The side sections are releasably coupled to the central portion and may be conveniently disconnected in order to adapt the device to fit a smaller sized windscreen.

In order to deploy the vehicle immobilisation device, the suction grip means 40a and 40b are disposed in the desired position on the vehicle windscreen. The plunger 43 of each suction grip means is pumped in order to evacuate air from the suction cup thereby causing it to seal securely to the windscreen surface. Once sufficient grip has been achieved, the screening means is placed over the suction grip means so that each pump handle 42a and 42b extends into a respective first covered aperture 47, and each protrusion 52 extends into a respective second aperture 48. A so-called disk lock 53 extends through an aperture provided in each of the protrusions thereby securing the screening means to the suction grip means and preventing access to the release mechanism 51.

Figure 10C:
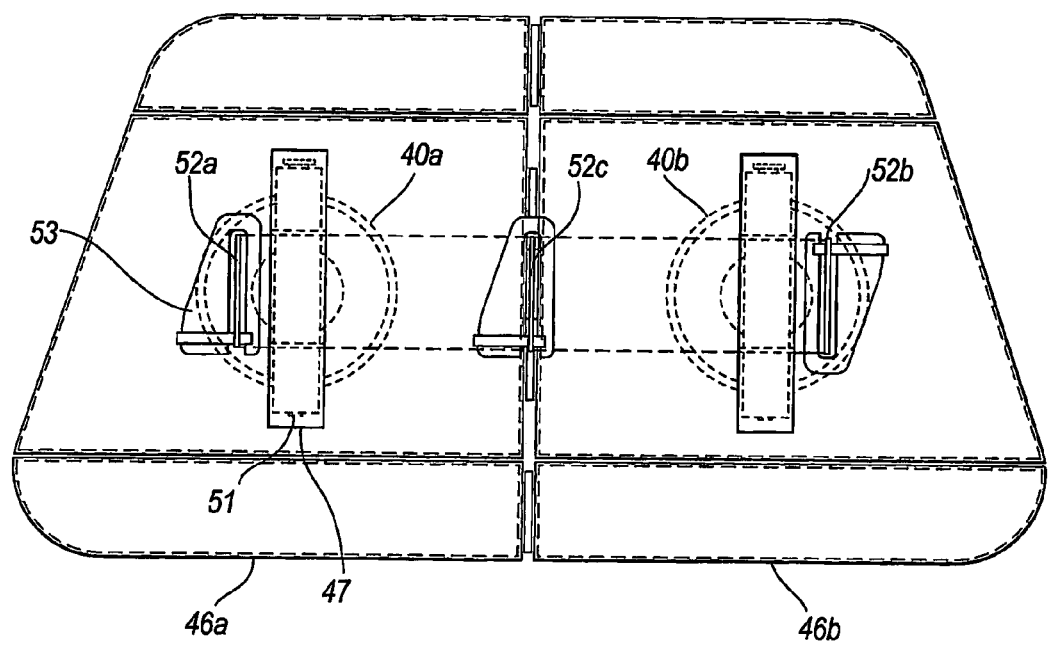

The relative positions of the suction grip means and the screening means, when in an in use deployment, is illustrated in FIG. 10C.

Figure 10D:
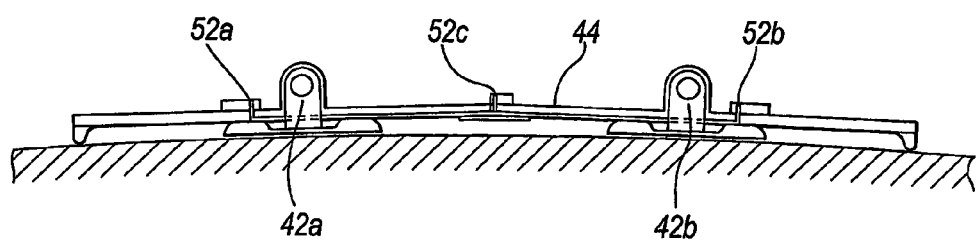

A side elevation of the deployed vehicle immobilisation device is shown in FIG. 10D. It can be seen that the configuration of two-part strut 44 advantageously allows the curvature of the windscreen upon which the device is secured to be accommodated for.

In order to remove the vehicle immobilisation device of this embodiment, the locks 53 must be unlocked so that the screening portions can be removed thereby allow access to the suction grip means 41a and 41b. A release 51 is provided which, when pressed, allows air to re-fill the suction cup so that the suction grip means may be detached.

In this embodiment, the screening portions therefore act as both a screening means and, coupled with the disk lock and protrusions, a security means preventing unauthorised access to the operation of the releasing means.

A variation of this embodiment comprises a single screen portion, which is formed of a central section and two side sections. The side sections are releasably coupled to the central section and may be conveniently disconnected in order to adapt the device to fit a smaller sized windscreen. The dimensions and shape of the screening means are such that, when the device is in an in-use disposition on the vehicle windscreen, the screening means serves to impair a drivers view through the windscreen.

Figure 11A:
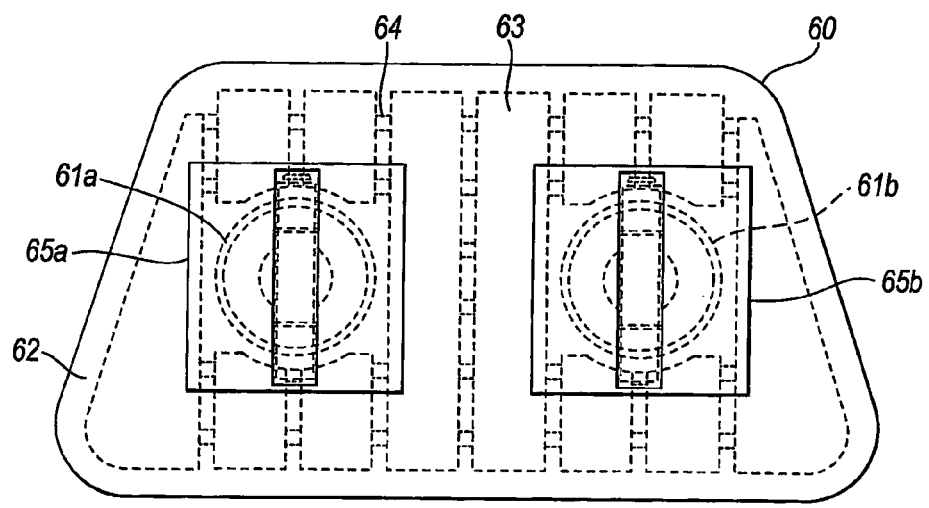
FIG. 11 shows a fifth embodiment of the present invention.
Figure 11B:
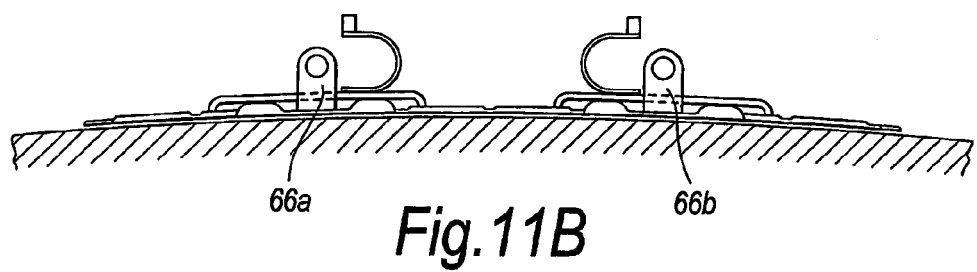
Figure 11C:
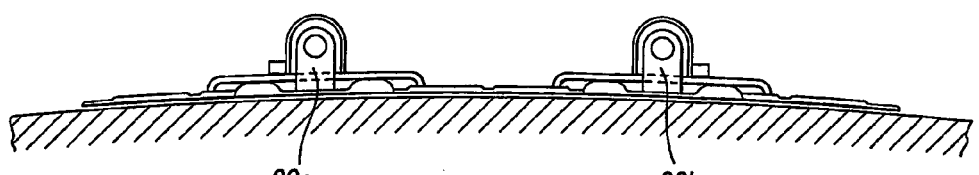
Figure 12A:
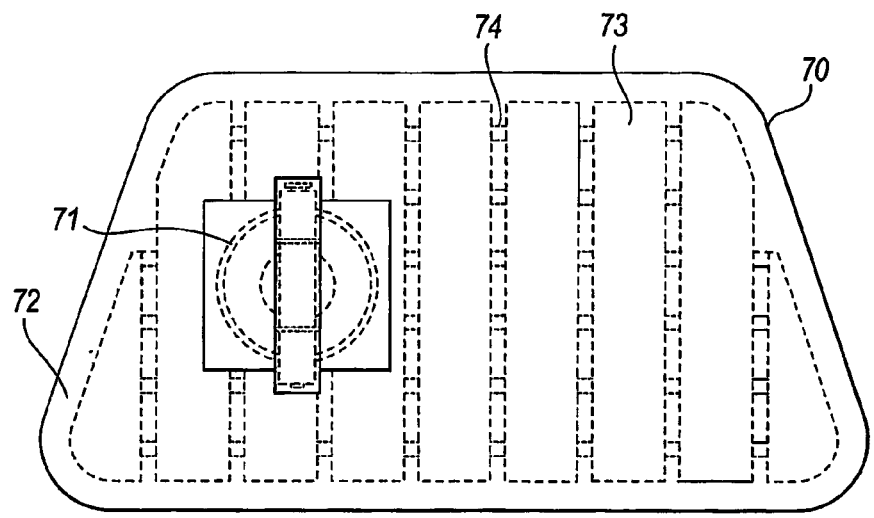
FIG. 12 shows a sixth embodiment of the present invention.
Figure 12B:
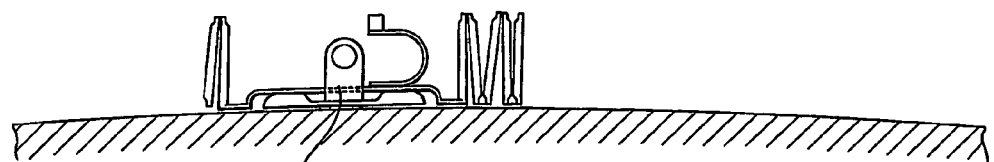
Figure 12C:
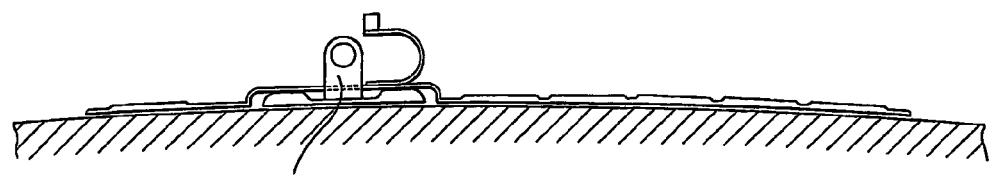
Figure 12D:
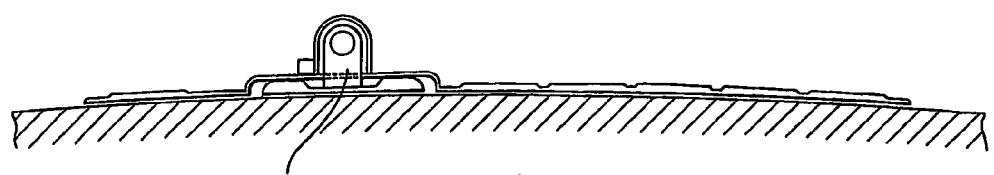

FIGS. 11A to 11C shows a further vehicle immobilisation device embodying the present invention. The device 60 comprises suction grip means 61a and 61b which function in an identical manner to those described with reference to FIG. 10. In this embodiment, an upper surface of the suction cups of the suction grip means are sonically welded to a flexible rubber screening means 62. The screening means is provided with rigid formings 63 which are joined together by means of links 64. The formings 63 serve to impart some rigidity to the otherwise flexible screening means and, together with the links 64, serve to prevent someone from cutting through the rubber in order to access the suction grip means.

When not in use, the device may be conveniently folded along the centre line in parallel with formings 63.

In order to deploy the device on a vehicle windscreen, the suction grip means 61a and 61b, together with the integrally formed screening means, are positioned on the windscreen and the plunger of each is pumped as previously described. Once the desired suction has been achieved, a pair of security covers 65a and 65b each having a covered aperture for the pump handle of the suction grip means, are lockably secured thereto by means of a locking means 66a and 66b. These also serve to press on the formings 63 in order to assist with holding the screening means in an infuse disposition. The locking means 66a and 66b are shown more clearly in FIGS. 11B and 11C.

An advantage of this embodiment is that it is relatively light and can be easily folded for storage. The formings 63 are formed of aluminium however any other rigid material, such as plastic, may be used.

FIG. 12 shows a further embodiment of the present invention. The device 70 comprises a suction grip means 71 which is sonically welded to a rubber screening means 72 having rigid formings 73 and links 74. This embodiment is similar to that shown in FIG. 11 except that it is provided with only one suction grip means 71, therefore making it less expensive to manufacture. A further advantage of this embodiment is its portability. As can be seen from FIG. 12B, the formings 73 are disposed so as to allow the screening means to be folded up in a concertina fashion. A locking means 76, illustrated in FIGS. 12C and 12D, is further provided to inhibit access to the release mechanism of the suction grip means.

Although the principal use of a vehicle immobilisation device embodying the present invention has been suggested as being an alternative to a traditional wheel clamp device for dealing with illegally parked vehicles, it will be appreciated that such a device embodying the present invention will find an application in any situation where the removal of a vehicle is to be prevented. For example an embodiment of the present invention can be used as a vehicle security device to prevent theft of the vehicle to which it is secured. It is therefore envisaged that embodiments of the present invention may be utilised by car vehicle owners/drivers as an anti-theft device. Such an embodiment could additionally or alternatively be used as a frost protection means. Furthermore, it is envisaged that embodiments of the present invention may, on the outer surface of the screening means, be light reflective. In this respect, the outer surface of the screening means could be provided with a light reflective surface.

The invention claimed is:

1. A vehicle immobilisation device for securing to a vehicle windscreen, comprising:
    a screen which, when the device is in an in-use disposition on the vehicle windscreen, serves to impair a driver's view through the windscreen, wherein the screen is changeable from a first configuration to a second configuration, the first configuration being more compact than the second configuration;
    a grip for holding said screen in said in-use disposition on said windscreen by suction;
    a release mechanism for enabling release of the suction of said grip so as to allow removal of the device from the windscreen; and
    a security mechanism for preventing unauthorized operation of said release mechanism.

2. A vehicle immobilisation device as claimed in claim 1, further comprising a pump handle that is operable by the user of the vehicle immobilisation device to produce the suction in the grip.

3. A vehicle immobilisation device as claimed in claim 2, wherein said pump handle is formed and arranged so as to serve also as a grip handle for lifting and carrying the vehicle immobilisation device.

4. A vehicle immobilisation device as claimed in claim 1, further comprising a housing for said releasing mechanism, and a cover moveable between an open position allowing access to said release mechanism and a closed position preventing access to said release mechanism, said security mechanism serving to lock said cover in said closed position.

5. A vehicle immobilisation device as claimed in claim 4, wherein said cover comprises a hinged lid.

6. A vehicle immobilisation device as claimed in claim 4, wherein said cover also acts as said screen.

7. A vehicle immobilisation device as claimed in claim 1, wherein a plurality of said grips are provided and wherein a cover and security mechanism are provided separately for each of said grips.

8. A vehicle immobilisation device as claimed in claim 1, further comprising a protective layer arranged to cushion the vehicle windscreen from contact with the device during fitting and when in said in-use disposition on said vehicle windscreen.

9. A vehicle immobilisation device as claimed in claim 8, wherein said protective layer is formed of high density foam.

10. A vehicle immobilisation device as claimed in claim 1, further comprising a grip protector for preventing access to said grip from an under-side of the device facing the windscreen when in said in-use disposition.

11. A vehicle immobilisation device as claimed in claim 9, wherein said protective layer is arranged around said suction grip means so as to serve as a grip protector.

12. A vehicle immobilisation device as claimed in claim 1, wherein said device assumes a substantially flat profile when in said in-use disposition.

13. A vehicle immobilisation device as claimed in claim 1, wherein parts of the device visible from the exterior of a vehicle when the device is in said in-use disposition on the vehicle are decorated in a highly visible finish.

14. A vehicle immobilisation device as claimed in claim 13, wherein said highly visible finish is a reflective finish.

15. A vehicle immobilisation device as claimed in claim 1, wherein said screen comprises a plurality of screen portions.

16. A vehicle immobilisation device as claimed in claim 15, wherein said screen portions are arranged and connected so as to be foldable or operable to be rolled up.

17. A vehicle immobilisation device as claimed in claim 1, wherein said screen comprises two screen portions which are hingeably connected together.

18. A vehicle immobilisation device as claimed in claim 1, wherein said screen comprises rubber.

19. A vehicle immobilisation device as claimed in claim 1, wherein the screen further comprises a plurality of rigid formings.

20. A vehicle immobilisation device as claimed in claim 18, wherein said screen is sonically welded to the suction grip.

21. A vehicle immobilisation device as claimed in claim 1, where said grip comprises one or more suction cups.

22. A vehicle immobilisation device as claimed in claim 1, wherein the width of the device is of the order of $2d \tan \theta$, where d is an estimate of the distance from the driver's eye to the vehicle windscreen, and $\theta$ is greater than $5°$.

23. A method for securing a vehicle immobilisation device as claimed in claim 1, to a vehicle windscreen, comprising the steps of:
    changing said screen from said first configuration to said second configuration;
    arranging said screen on the vehicle windscreen in said in-use disposition so as to impair a driver's view through the windscreen;
    activating said grip so as to hold said screen in said in-use disposition on said windscreen by means of suction; and
    activating said security mechanism so as to prevent unauthorized operation of said release mechanism.

24. A method as claimed in claim 23, wherein said screen is arranged on said vehicle windscreen such that the centre of the screen is substantially in the driver's line of vision.

25. A method as claimed in claim 23, wherein the vehicle immobilisation device is placed on the exterior of the vehicle windscreen.

26. A method as claimed in claim 23 further comprising the step of applying an information sticker to the windscreen.

27. A method for removing a vehicle immobilisation device secured to a vehicle windscreen by a method as claimed in claim 23, comprising the steps of:

de-activating said security mechanism so as to enable operation of said release mechanism;

operating said release mechanism to deactivate said suction grip;

removing the vehicle immobilisation device from the vehicle windscreen; and changing said screen from said second configuration to said first configuration.

28. A method of preventing a vehicle from being driven away, comprising attaching a device as claimed in claim 1 to the vehicle windscreen.

29. A vehicle immobilisation device for securing to a vehicle windscreen, comprising:

screening means which, when the device is in an in-use disposition on the vehicle windscreen, serves to impair a driver's view through the windscreen, wherein the screening means is changeable from a first configuration to a second configuration, the first configuration being more compact than the second configuration;

suction grip means for holding said screening means in said in-use disposition on said windscreen by suction;

releasing means for enabling release of the suction of said suction grip means so as to allow removal of the device from the windscreen; and security means for preventing unauthorized operation of said releasing means.

30. A method for securing a vehicle immobilisation device as claimed in claim 29 to a vehicle windscreen, comprising the steps of:

changing said screening means from said first configuration to said second configuration;

arranging said screening means on the vehicle windscreen in said in-use disposition so as to impair a driver's view through the windscreen;

activating said grip means so as to hold said screening means in said in-use disposition on said windscreen; and activating said security means so as to prevent unauthorized operation of said releasing means.

31. A method for removing a vehicle immobilisation device secured to a vehicle windscreen by a method as claimed in claim 30, further comprising the steps of:

de-activating said security means so as to enable operation of said releasing means;

operating said releasing means to deactivate said suction grip means;

removing the vehicle immobilisation device from the vehicle windscreen; and changing said screening means from said second configuration to said first configuration.

* * * * *